(12) United States Patent
Kimbara et al.

(10) Patent No.: US 6,675,857 B2
(45) Date of Patent: Jan. 13, 2004

(54) TIRE ASSEMBLING METHOD AND REFITTING APPARATUS FOR USE IN REFIT OF TIRE ASSEMBLY

(75) Inventors: Toshiyuki Kimbara, Anjo (JP); Shigeru Shimizu, Anjo (JP)

(73) Assignee: Central Motor Wheel Co., Ltd., Aichi-Ken (JP)

( * ) Notice: Subject to any disclaimer, the term of this patent is extended or adjusted under 35 U.S.C. 154(b) by 11 days.

(21) Appl. No.: 10/188,187

(22) Filed: Jul. 1, 2002

(65) Prior Publication Data

US 2003/0006014 A1 Jan. 9, 2003

(30) Foreign Application Priority Data

Jul. 4, 2001 (JP) ........................................ 2001-203452

(51) Int. Cl.$^7$ ............................................... B60C 25/00
(52) U.S. Cl. .............................. 157/1; 157/1.17; 157/1.2
(58) Field of Search ............................. 157/1, 1.17, 1.2

(56) References Cited

U.S. PATENT DOCUMENTS 6,148,892 A * 11/2000 Koerner et al. .............. 157/1.1
6,467,524 B2 * 10/2002 Ronge et al. ............... 157/1.17

* cited by examiner

Primary Examiner—James G. Smith
(74) Attorney, Agent, or Firm—Darby & Darby (57) ABSTRACT

A refitting apparatus for a tire assembly "w" having a disk wheel "a" having engaging rims and a tire "d" fitted to the disk wheel and having tire bead rims and side walls. The apparatus is constituted to perform a refit process in which a pressing step of bringing one of the tire bead rims "e" of the tire into pressing contact with one of the engaging rims "b" of the disk wheel "a" by supplying air into the tire "d" and a releasing step of releasing the one of tire bead rims "e" of the tire "d" from the one of engaging rims "b" of the disk wheel "a" are repeated a predetermined number of times for each of the tire bead rims "e". Since the tire bead rims "e" are repeatedly brought into pressing contact with the engaging rims "b" and released therefrom, the tire bead rims "e" snugly fit with the engaging rims "b", so that the RFV value is considerably lowered and stable maneuverability during driving can be obtained unless the fitting state is subsequently changed.

6 Claims, 9 Drawing Sheets

TIRE ASSEMBLING METHOD AND REFITTING APPARATUS FOR USE IN REFIT OF TIRE ASSEMBLY

BACKGROUND OF THE INVENTION

This invention relates generally to a method of assembling a tire assembly having a tire fitted to a disk wheel for use in automobiles and the like including snug fitting for making the fit between the tire and the disk wheel rim tight, and to a refitting apparatus for use in the sung fitting.

Figure 8:
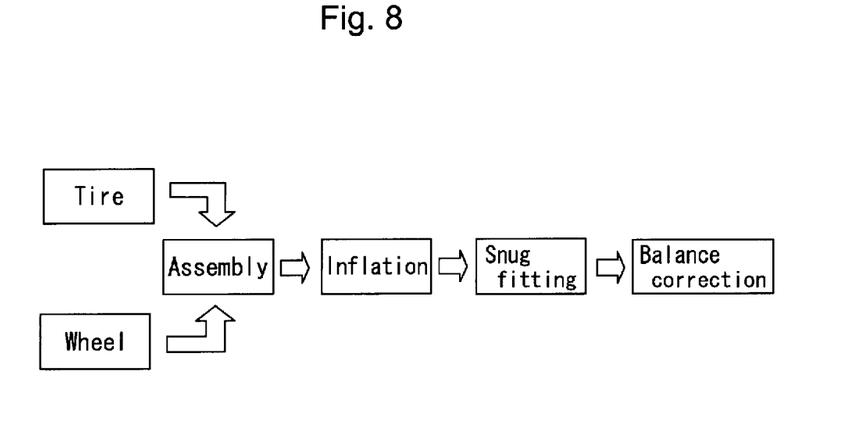
FIG. 8 is a flowchart illustrating the procedure of a conventional tire assembling process.
Figure 9:
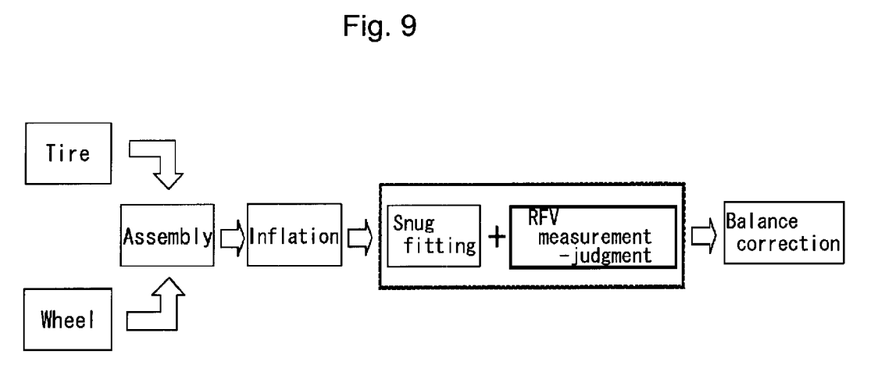
FIG. 9 is a flowchart illustrating the procedure of a tire assembling process according to this invention.

As shown in FIG. 8, a tire assembly is made in a series of steps; tire and wheel are fitted together, inflated with air, and subjected to a snug fitting process and to a balance correction process. The snug fit is checked by sampling inspection, and a snug fitting apparatus including means for making measurement-judgment immediately after the snug fitting process as shown in FIG. 9 has been proposed by the present inventors. Through such a series of processes including the measurement-judgment, the snug fit state is assured for all the tire assemblies, and so the tire assemblies of good quality can be provided.

The current circumstances of the snug fitting are as follows.

The tire assembly made by fitting the tire to the disk wheel and being filled with air exhibits slight unbalance in mass distribution due to variation in the tire dimensions, rigidity, weight distribution, true circle accuracy of the disk wheel, and the state of fit between both of the components, which causes vibration and adversely affects riding comfort and maneuverability when a vehicle is driven. Therefore, various measures are taken to solve the problem of the unbalance, especially to reduce the magnitude of variation in the radial force (RFV).

Here, the state of fit between the tire and wheel is settled when air is injected to inflate the tire to a specified shape at the time of assembling the tire. However, in some cases the air injection only is not sufficient to produce a snug and stabilized state of fit, and unbalance may result. Therefore, a process of correcting the incomplete fit between tire and rim is employed in which a lateral force that can occur during actual vehicle run is applied in advance to the tire assembly to make the fit between tire and rim snug. As means for performing such a snug fitting process, there is one constituted to press a roller against the ground contact surface area of a rotating tire assembly to apply a lateral force to that area (Japanese Utility Model Registration No. 2553192).

As described above, a snug fitting process apparatus has been proposed with which the ground contact surface moving along its entire circumference of the tire assembly is pressed to improve the snugly fit state between the wheel and tire so that the vibration due to non-uniform fit state between the rim and tire is prevented from occurring. However, an inspection on tire assemblies having undergone the snug fitting proves that the fit state of same of the tire assemblies is not at a permissible level. Such tire assemblies need refitting, but the refitting is inefficient for the following reasons: the refitting must be performed using an apparatus provided outside the assembly line or manually and thus takes considerable effort; and there must be a maintenance worker on duty at all times. Also, an apparatus has been proposed by the present inventors with which the RFV (magnitude of variation in the radial force) of all the produces can be checked inline and the trend is toward a system capable of providing high-quality tire assemblies which can provide riding comfort. Then, in accordance with this trend, a demand for a snug fitting process suitable for one hundred percent inspection is increasing. The one hundred percent inspection is proposed to assure high quality, so that the permissible level of the RFV is high. Thus, to realize the system shown in FIG. 9 with efficiency, effective snug fitting means with which the snug fitting can be performed inline is highly demanded.

SUMMARY OF THE INVENTION

It is, therefore, an object of the present invention to provide snug fitting means with which snug fitting can be performed for every tire assembly inline and which can further lower the RFV value of tire assemblies.

In accordance with one aspect of the present invention, there is provided, in a method of assembling a tire assembly comprising a disk wheel provided with a pair of first and second engaging rims, and a tire fitted to said disk wheel and having a pair of first and second side walls from which a pair of first and second tire bead rims extend, respectively, for releasably engaging said first and second engaging rims, respectively, a refit process comprising:

(a) a first pressing step of bringing said first tire bead rim of said tire into pressing contact with said first engaging rim of said disk wheel;

(b) a first pressure releasing step of releasing the pressing contact between said first bead rim of said tire and said first engaging rim of said disk wheel;

(c) a second pressing step of bringing said second tire bead rim of said tire into pressing contact with said second engaging rim of said disk wheel; and (d) a second pressure releasing step of releasing the pressing contact between said second bead rim of said tire and said second engaging rim of said disk wheel.

A series of the above steps (a) through (d) may be conducted once or at least two times.

In this method of assembling tire assembly, the pressing step of bringing the tire bead rim of the tire into pressing contact with the engaging rim of the disk wheel and the releasing step of releasing the pressing contact of the tire bead rim of the tire with the engaging rim of the disk wheel are successively repeated. Thereby, the tire bead rims of the tire snugly fit and closely contact with the engaging rims of the disk wheel. Since the tire bead rims of the tire are repeatedly pressed against the engaging rims of the disk wheel and released therefrom, the tire bead rims of the tire snugly fit with the engaging rims of the disk wheel, so that the RFV value is considerably lowered. Thus, stable maneuverability during driving can be obtained unless the fitting state is subsequently changed.

In another aspect, the present invention provides, in a method of assembling a tire assembly comprising a disk wheel provided with a pair of first and second engaging rims, and a tire fitted to said disk wheel and having a pair of first and second side walls from which a pair of first and second tire bead rims extend, respectively, for releasably engaging said first and second engaging rims, respectively, a refit process comprising:

(a) a first pressing step including pressing said first side wall of said tire from outside to form a first gap between the first tire bead rim of said tire and said first engaging rim of said disk wheel, and injecting air through said first gap to bring said second tire bead rim of said tire into pressing contact with said second engaging rim of said disk wheel, (b) a first pressure releasing step of releasing air from said tire through said first gap, (c) a first releasing step of pressing said second side wall of said tire from outside to release said second tire bead rim of said tire from said second engaging rim of said disk wheel and to form a second gap between the second tire bead rim of said tire and said second engaging rim of said disk wheel, (d) a second pressing step including bringing said first tire bead rim of said tire into contact with said first engaging rim of said disk wheel, and injecting air through said second gap to bring said first tire bead rim of said tire into pressing contact with said first engaging rim of said disk wheel, (e) a second pressure releasing step of releasing air from said tire through said second gap, and (f) a second releasing step of pressing said first side wall of said tire from outside to release said first tire bead rim of said tire from said first engaging rim of said disk wheel.

A series of the above steps (a) through (f) may be repeated once or two or more times.

In the second aspect of the present invention, high-pressure air is injected into the tire to bring the tire bead rim thereof into pressing contact with the engaging rim of the disk wheel and then released from the tire through that gap between the tire bead rim of the tire and the engaging rim of the disk wheel through which it has been injected to make it possible to apply a pressure to the other side wall of the tire from outside. Then, the other tire bead rim of the tire is released from the other engaging rim of the disk wheel. By performing this procedure alternately on both sides of the tire assembly, the tire beads can be pressed against the engaging rims of the disk wheel and released therefrom.

The process, which can be performed by applying a pressure to the side wall of the tire from outside to release the tire bead rim of the tire from the engaging rim of the disk wheel and injecting high-pressure air through the gap therebetween, can be performed inline easily and rapidly.

The present invention further provides a refitting apparatus for a tire assembly having a disk wheel provided with a pair of first and second engaging rims, and a tire fitted to the disk wheel and having a pair of first and second side walls from which a pair of first and second tire bead rims extend, respectively, for releasably engaging the first and second engaging rims, respectively, said apparatus comprising:

a holding device for holding the tire assembly in a holding position;

upper and lower movable drums disposed above and below, respectively, said holding position, each of said upper and lower movable drums having an annular pressing edge at an end thereof and a pressure controlling space which is formed inside said annular pressing edge;

driving mechanisms operable for moving said upper and lower movable drums toward and away from said holding position;

pressurizing means connected to said pressure controlling space of each of said upper and lower movable drums for injecting high pressure air thereinto to create a high-pressure state in said pressure controlling space;

pressure releasing means connected to said pressure controlling space of each of said upper and lower movable drums for releasing said high pressure air therefrom to create a low-pressure state in said pressure controlling space;

controlling means for executing a refit process comprising:

a first pressing step including moving one of the upper and lower movable drums toward said tire assembly so that said annular pressing edge thereof applies a pressure to said first side walls of said tire from outside to form a first gap between said first tire bead rim of said tire and said first engaging rim of said disk wheel, and injecting air into said tire through said first gap by creating said high-pressure state in said pressure controlling space to bring said second tire bead rim of said tire into pressing contact with said second engaging rim of said disk wheel;

a first pressure releasing step of releasing air from said tire through said first gap by creating said low-pressure state in said pressure controlling space in said movable drum;

a first releasing step including moving said second movable drum toward said tire assembly so that said annular pressing edge thereof applies a pressure to said second side wall of said tire from outside to release said second tire bead rim of said tire from said second engaging rim of said disk wheel and to form a second gap between said first tire bead rim of said tire and said second engaging rim of said disk wheel;

a second pressing step including moving said one movable drum away from said tire assembly to release said pressure on said first side wall and to bring said first tire bead rim of said tire into contact with said first engaging rim of said disk wheel, and injecting air into said tire through said second gap by creating said high-pressure state in said pressure controlling space in the other one of said upper and lower movable drum to bring said first tire bead rim of said tire into pressing contact with said first engaging rims of said disk wheel;

a second pressure releasing step of releasing air in said tire through said second gap by creating said low-pressure state in said pressure controlling space in said the other movable drum; and a second releasing step of moving said one movable drum toward said tire assembly so that said annular pressing edge of said movable drum applies a pressure to said first side wall of said tire from outside to release said first tire bead rim of said tire from said first engaging rim of said disk wheel.

With the above constitution, each of the movable drums has a pressure controlling space therein and is capable of being controlled to move up and down. Thus, by moving up and down the movable drums, applying a pressure to the side walls and releasing the pressure therefrom can be easily performed stepwise. Also, in the state where the side wall is pressed, the inside of the tire are communicated to the pressure controlling space via the gap between the tire bead rim of the tire and the engaging rim of the disk wheel, so that, by switching the pressure controlling space between the high-pressure state and the low-pressure state, the pressure in the tire can be increased and decreased. Thus, the refitting process (snug fitting process) can be performed only by moving up and down the movable drums and controlling the pressure in the pressure controlling spaces. Moreover, it is possible to inflate the tire to a desired pressure in the final stage of the refitting process. Thus, the refit apparatus is suitable for performing the refit process inline.

BRIEF DESCRIPTION OF THE DRAWINGS

Other objects, features and advantages of the present invention will become apparent from the detailed description of the preferred embodiments of the invention which follows, when considered in the light of the accompanying drawing, in which.

DETAILED DESCRIPTION OF THE PREFERRED EMBODIMENTS OF THE INVENTION

Figure 1:
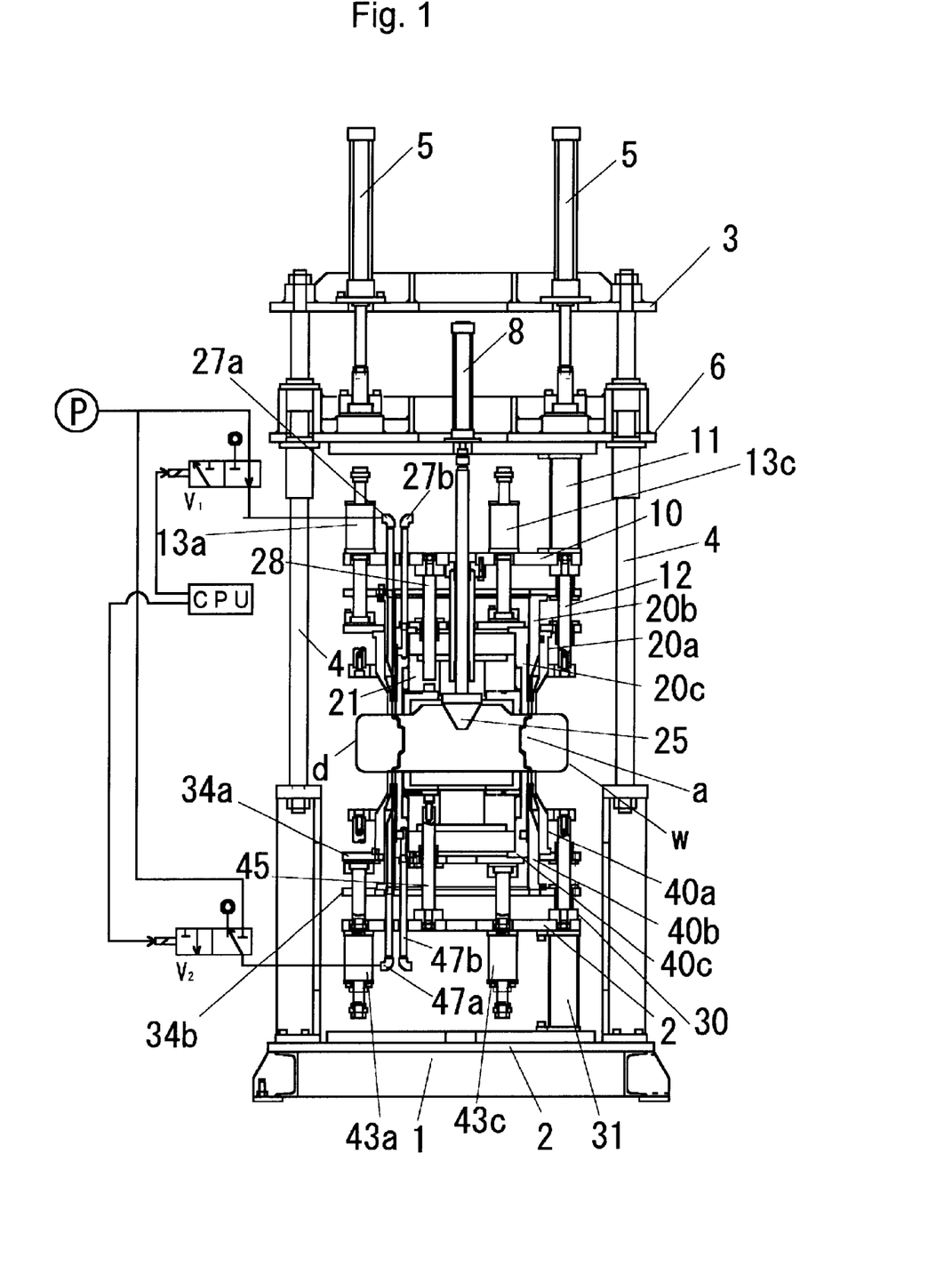
FIG. 1 is a general view of a refitting apparatus according to one embodiment of this invention.
Figure 2:
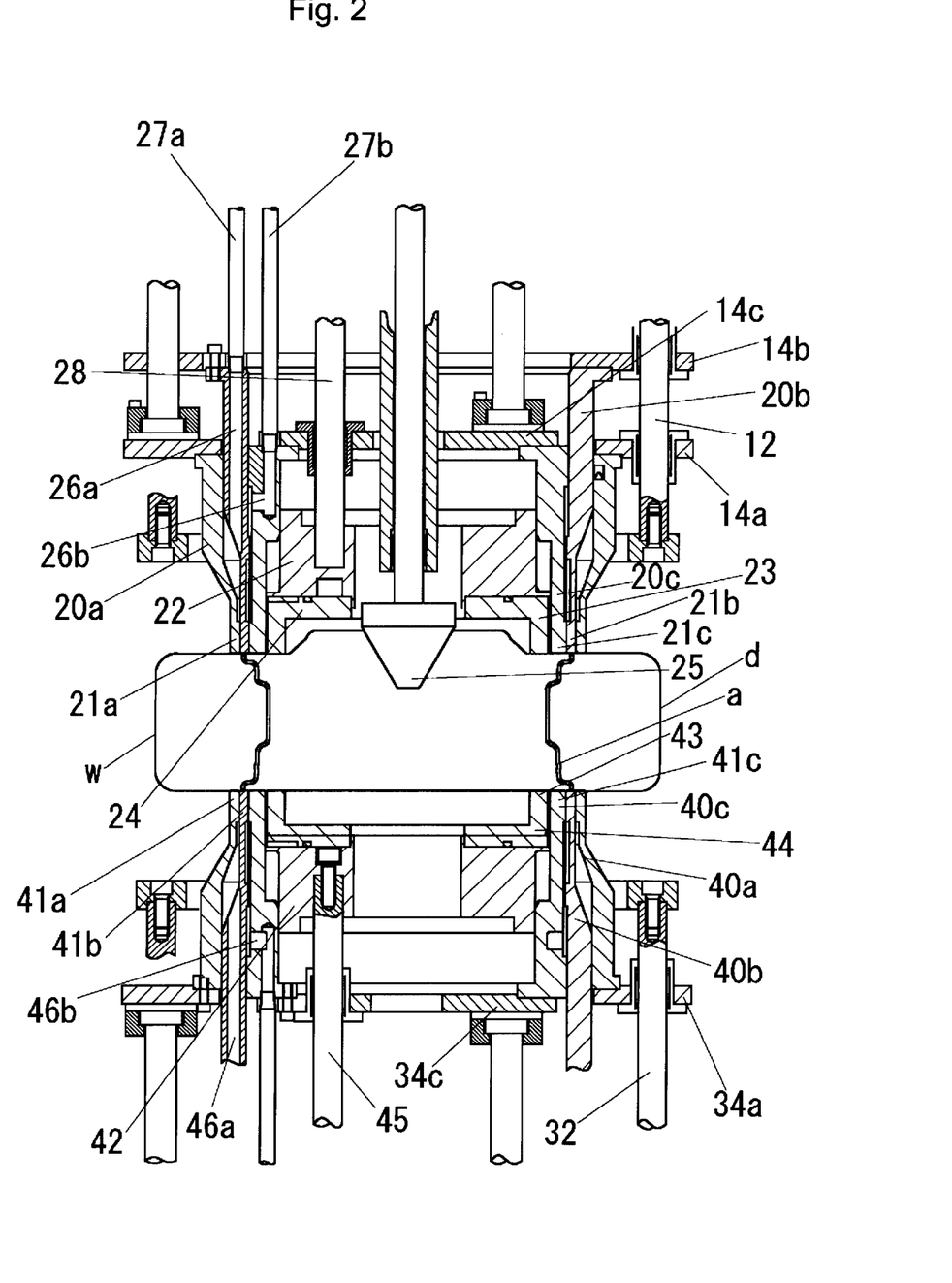
FIG. 2 is an enlarged view of a part of the refitting apparatus.
Figure 3:
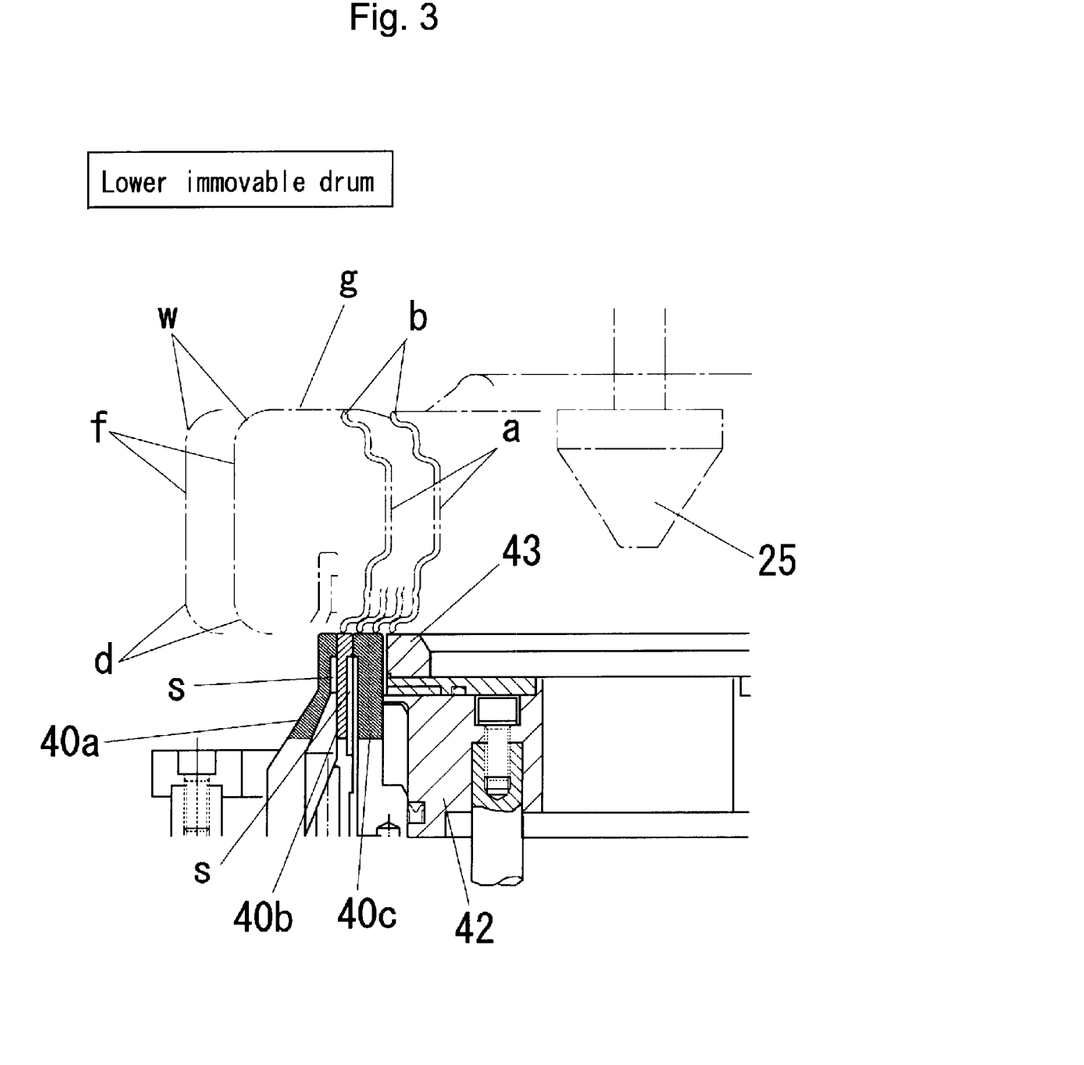
FIG. 3 is an enlarged view illustrating a holding function of the refitting apparatus.

FIG. 1 to FIG. 3 are general front views of a refitting apparatus as a first embodiment of this invention.

Figure 4:
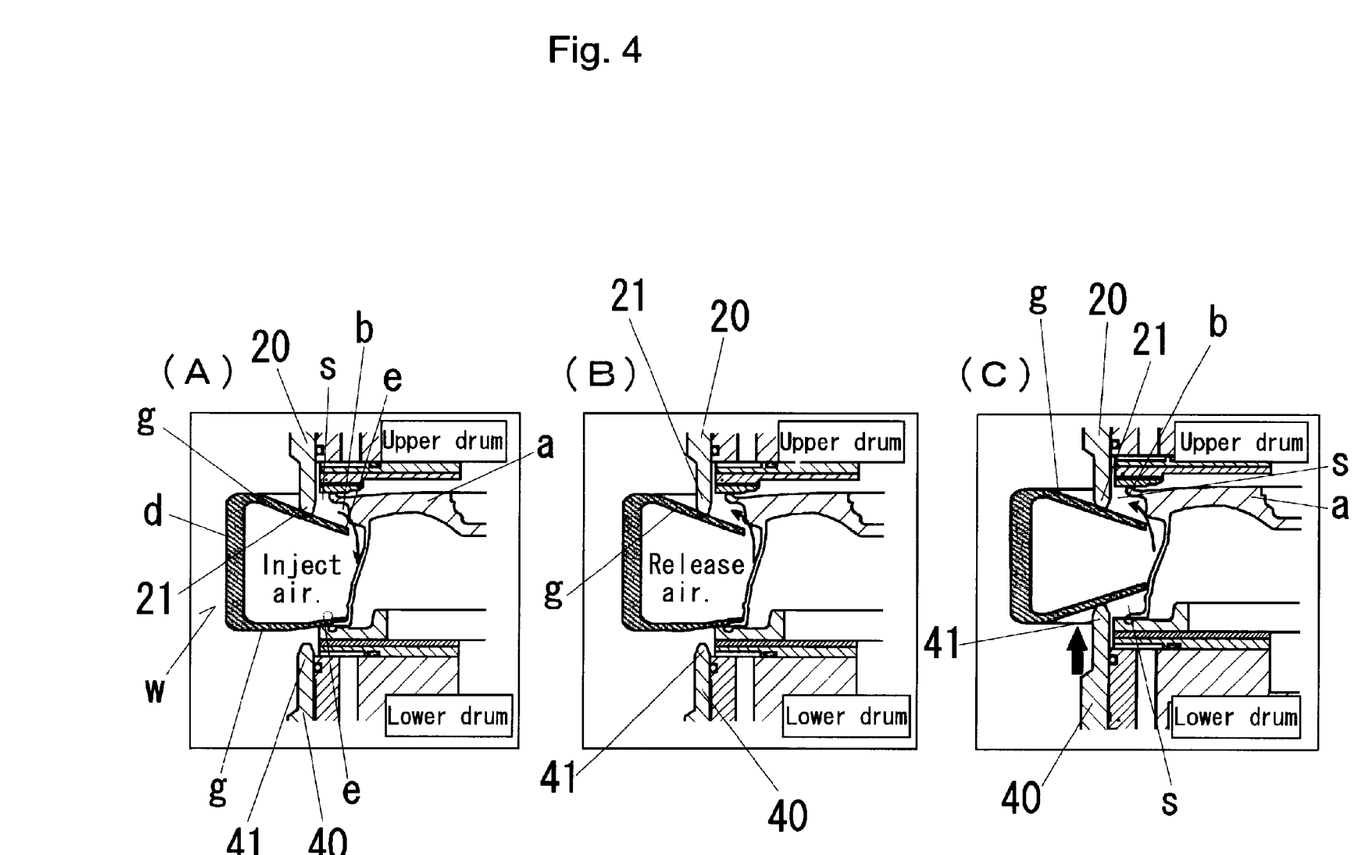
FIGS. 4(a) through 4(c) are explanatory views illustrating steps of snugly fitting a lower part "e" of a tire to a part "b" of a disk wheel.

A tire assembly "w", as shown in FIGS. 4(a) through 4(c) and so on, is made by fitting tire bead rims "e" of a tire "d" to engaging rims "b" of a disk wheel "a", and inflating the tire "d" with air to a specified pressure. The tire assembly "w" is then subjected to the refit process according to this invention, and conventional snug fitting process and measurement-judgment process in succession.

FIG. 1 and FIG. 2 are general front views of a refit process apparatus as a first embodiment of this invention.

A lower support table 2 and guide rods 4 are supported on machine base 1, and an upper support table 3 is provided on the guide rods 4. On the upper support table 3 is provided lifting cylinders 5 driven to move up and down a lift frame 6 along the guide rods 4. The lift frame 6 is provided with a holding cylinder 8. A fitting table 10 is suspended from the lift frame 6 by a support rod 11, and a guide rod 12 along which movable drums 20a and 20b are vertically guided are supported by the fitting table 10. On the fitting table 10 are also supported sealed cylinders 13a, 13b, 13c (the sealed cylinder 13b is not shown) for moving up and down the movable drums 20a, 20b and 20c, respectively, with their cylinder rods protruded downward. The movable drums 20a and 20b are supported by lifting plates 14a and 14b, respectively, which are moved up and down along the guide rod 12. The lifting plates 14a and 14b are controlled to move up and down by sealed cylinder 13a and 13b, respectively, so that the movable drums 20a and 20b can be controlled to move up and down independently. The rod of the sealed cylinder 13a is connected to a lifting plate 14c supporting the inner movable enclosed drum 20c slidably received within the intermediate movable drum 20b. The lifting plate 14c is moved up and down along a supporting rod 28 of a holding body 22. Beneath the holding body 22 is secured a pressing plate 24 having an annular pressing edge 23. As described later, the pressing plate 23 is controlled to move up and down by a lifting cylinder 5 to press and hold the disk wheel a.

The holding cylinder 8 has a lower end to which a truncated conical stopper 25 which is moved up and down through an inner hole formed through the holding body 22 is secured. The stopper 25 is fitted in a hub hole formed at the center of the disk wheel "a" of the tire assembly "w", and the inclined peripheral surface of the stopper 25 can place and hold the tire assembly "w" in position. Thus, above the tire assembly "w" held in position by the stopper 25 as described later, the movable drums 20a, 20b and 20c and the holding body 22, whose vertical positions are controlled by sealed cylinder 13a, 13b and 13c and the lifting cylinder 5, respectively, are disposed concentrically from the outside. In the present invention, the movable drums 20a, 20b and 20c have annular pressing edges 21a, 21b and 21c, respectively, at a lower end thereof, and pressure controlling spaces "s" (see FIG. 3) are formed in the annular pressing edges 21a and 21b of the movable drums 21a and 21b. Air passages 26a and 26b are formed in the movable drums 20b and 20c, respectively, and connected to air pipes 27a and 27b, respectively, so that the air pressure in the pressure controlling spaces "s" may be controlled. The pressure control spaces "s" are communicated to the outside only through the air pipes 27a and 27b to maintain the airtightness thereof. The pressure controlling spaces "s" are connected to an external high-pressure air source P via the air passages 26a and 26b, air pipes 27a and 27b and so on, and the internal pressure in the pressure controlling spaces "s" can be switched between a high-pressure state and a low-pressure state by switching an electromagnetic valve V1. The switching of the electromagnetic valve V1 is controlled by a central processing unit CPU. Namely, controlling means for executing the refit process by the refitting apparatus is constituted of the central processing unit CPU, the electromagnetic valve V1, a hereinafter described electromagnetic valve V2 and so on. The high-pressure air source provides a pressure in the range of 2.0–4.5 kg/cm². The pressure in the low-pressure state is atmospheric pressure but may be higher than atmospheric pressure.

On the lower support table 2, a fitting table 30 is supported by a supporting rod 31, and on the fitting table 30 is supported a guide rod 32 along which movable drums 40a and 40b are vertically guided. On the fitting table 30 are also supported sealed cylinders 43a, 43b and 43c (the sealed cylinder 43c is not shown) for moving up and down the moveable drum 40a, 40b and 40c, respectively, with their rod protruded upward. The movable drums 40a and 40b are supported by lifting plates 34a and 34b, respectively, which are moved up and down along the guide rod 32. The lifting plates 34a and 34b are controlled to move up and down by sealed cylinders 43a and 43b, respectively, so that the movable drums 40a and 40b can be controlled to move up and down independently. The rod of the sealed cylinder 43a is connected to a lifting plate 34c supporting the inner movable drum 40c slidably received within the intermediate movable drum 40b. The lifting plate 34c is moved up and down along a supporting rod 45 of a holding body 42. The holding body 42 is fixed on the fitting table 30 by the supporting rod 45. On the holding body 42 is secured a pressing plate 44 having an annular pressing edge 43. As described later, when the holding body 22 is lowered by the lifting cylinder 5 and the annular pressing edge 23 thereof presses and holds the disk wheel "a", when the disk wheel "a" has a small diameter, the rim thereof is pressed against the annular pressing edge 43. Namely, the position of the tire assembly "w" on the holding body 41 is the hold position thereof.

Below the tire assembly "w" held in the holding position, the movable drums 40a, 40b and 40c and the holding body 42, whose vertical positions are controlled by sealed cylinder 43a, 43b and 43c and the lifting cylinder 5, respectively, are disposed concentrically from the outside. In the present invention, the movable drums 40a, 40b and 40c have lower annular pressing edges 41a, 41b and 41c, respectively, at an upper end thereof, and pressure controlling spaces "s" are formed in the annular pressing edges 41a and 41b of the movable drums 40a and 40b. Air passages 46a and 46b are formed in the movable drum 40b and 40c, respectively, and connected to air pipes 47a and 47b, respectively, so that the air pressures in the pressure controlling spaces "s" may be controlled. The pressure control spaces "s" are communicated to the outside only through the air pipes 47a and 47b to maintain the airtightness thereof. The pressure controlling spaces "s" are connected to the external high-pressure air source P via the air passages 46a and 46b, air pipes 47a and 47b and so on, and the internal pressure in the pressure controlling spaces "s" can be switched between a high-pressure state and a low-pressure state by switching the electromagnetic valve V2. The switching of the electromagnetic valve V2 is controlled by the central processing unit CPU.

As described above, the annular pressing edges 21a, 21b and 21c of the movable drums 20a, 20b and 20c and a pressing plate 24 of the holding body 22 are concentrically disposed above the tire assembly "w" for vertical movement and the pressure controlling spaces "s" whose internal pressure can be controlled are formed in the annular pressing edges 21a and 21b (see FIG. 3). Below the tire assembly "w", the annular pressing edges 41a, 41b and 41c of the movable drums 40a, 40b and 40c and a pressing plate 44 of the holding body 42 are concentrically disposed for vertical movement (except the a pressing plate 44) and the pressure controlling spaces "s" whose internal pressure can be controlled are formed in the annular pressing edges 41a and 41b (see FIG. 3). This constitution makes a hereinafter described refit process possible.

The refitting apparatus of the present invention has the plural upper movable drums 20a, 20b and 20c and plural lower moveable drums 40a, 40b and 40c so as to be able to hold engaging rims of the disk wheels with different diameters. Disk wheels come in 17 inch, 15 inch, 16 inch and 14 inch diameter. As shown in FIG. 3, when refitting of a disk wheel "a" with a diameter of 17 inches is performed, the outer movable drums 20a and 40a are used to press the side walls "g" and the intermediate movable drums 20b and 40b are used to clamp the upper and lower engaging rims "b" of the disk wheel "a", making the disk wheel "a" stabilized. When refitting of a disk wheel "a" with a diameter of 15 inches or 16 inches is performed, the intermediate movable drums 20b and 40b are used to press the side walls "g" and the intermediate movable drums 20c and 40c are used to clamp the upper and lower engaging rims of the disk wheel "a", making the disk wheel "a" stabilized. When refitting of a disk wheel "a" with a diameter of 14 inches is performed, the inner movable drums 20c and 40c are used to press the side walls "g" and the upper and lower engaging rims of the disk wheel "a" are clamped by the annular pressing edges 23 and 43 of the holding bodies 22 and 24, making the disk wheel "a" stabilized.

The above constitution makes it possible to perform refitting of tire assemblies "w" having disk wheels "a" with different diameters. To perform refitting of tire assemblies "w" with disk wheels "a" of only one size, the refitting apparatus may only have one upper movable drum 20 and one lower movable drum 40, and upper and lower holding bodies 20 and 40.

For better understanding of the function of this invention, description will be hereinafter made of the refitting apparatus having one upper movable drum 20 and one lower movable drum 40, and upper and lower holding bodies 22 and 42 with reference to FIGS. 4(a) through 4(c), FIGS. 5(a) through 5(c) and FIGS. 6(a) and 6(b).

Prior to the refit process, the tire assembly "w" having the tire "a" and the disk wheel "d" fitted thereto is fed to a holding position between the holding bodies 22 and 42, centered by the stopper 25, and had the upper and lower engaging rims of the disk wheel "a" clamped by the annular pressing edges 23 and 43 of the upper and lower holding bodies 22 and 42 to prevent movement.

As shown in FIG. 4(a), the upper movable drum 20 is lowered so that the annular pressing edge 21 thereof applies a pressure to the upper side wall "g" of the tire "d" of the tire assembly "w" from above to release the upper tire bead rim "e" of the tire "d" from the upper engaging rim "b" of the disk wheel "a". Then, the pressure controlling space "s" formed in the annular pressing edge 21 is communicated to the high-pressure air source P to supply high-pressure air into the tire "d" through a gap between the upper tire bead rim "e" and the upper engaging rim "b" of the disk wheel "a". Namely, the external high-pressure air source P connected via air passages (the air passages 26a and 26b and the air pipes 27a and 27b) is communicated to the pressure controlling space "s" by switching the electromagnetic valve V1 constituting a part of the controlling means of the refitting apparatus to fill the tire "d" with high-pressure air. Thereby, the lower tire bead rim "e" is pressed against the lower engaging rim "b" of the disk wheel "a" (first pressing step).

Then, as shown in FIG. 4(b), the electromagnetic valve V1 is switched to communicate the pressure controlling space s in the annular pressing edge 21 to the atmosphere, letting out the air in the tire "d" through the gap between the upper tire bead rim "e" and the upper engaging rim "b" to lower the pressure in the tire "d" (first pressure releasing step).

Next, as shown in FIG. 4(c), the lower movable drum 40 is moved up so that the annular pressing edge 41 applies a pressure to the lower side wall "g" of the tire "d" of the tire assembly "w" from below to release the upper tire bead rim "e" from the upper engaging rim "b" of the disk wheel "a" (first releasing step).

Figure 5:
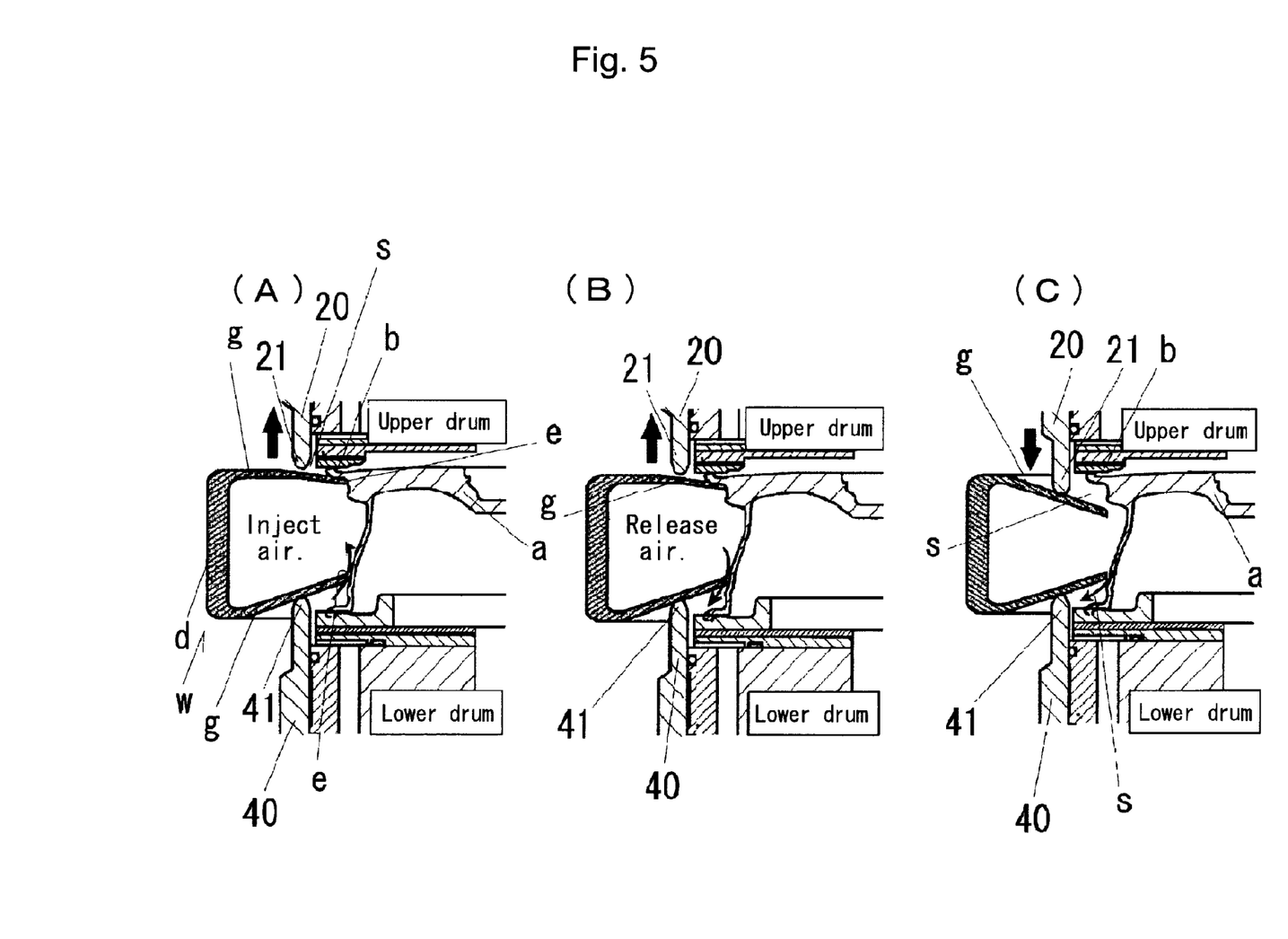
FIGS. 5(a) through 5(c) are explanatory views illustrating steps of snugly fitting an upper part "e" of a tire to a part "b" of a disk wheel.

Then, as shown in FIG. 5(a), the upper movable drum 20 is moved up to bring the upper tire bead rim "e" into contact with the upper engaging rim "b" of the disk wheel "a". The pressure controlling space "s" of the annular pressing edge 41, which is pressing the lower side wall "g" from below, is communicated with the high-pressure air source P. Namely, the external high-pressure air source P connected via air passages (the air passages 46a and 46b and the air pipes 47a and 47b) is communicated to the pressure controlling space "s" in the annular pressing edge 41 by switching the electromagnetic valve V2 constituting a part of the controlling means of the refitting apparatus to supply high-pressure air into the tire through the gap between the lower tire bead rim "e" and the lower engaging rim "b" of the disk wheel "a". Thereby, the upper bead rim "e" is pressed against the upper engaging rim "b" of the disk wheel "a" (second pressing step).

Next, as shown in FIG. 5(b), the electromagnetic valve V2 is switched to communicate the pressure controlling space "s" in the annular pressing edge 41 to the atmosphere, letting out the air in the tire "d" through the gap between the lower tire bead rim "e" and the lower engaging rim "b" of the disk wheel "a" to lower the pressure in the tire (second pressure releasing step).

Then, as shown in FIG. 5(c), the upper moveable drum 20 is lowered so that the annular pressing edge 21 thereof applies a pressure to the upper side wall "g" of tire "d" from above to release the upper tire bead rim "e" from the upper engaging rim "b" of the disk wheel "a" (second releasing step).

Figure 6:
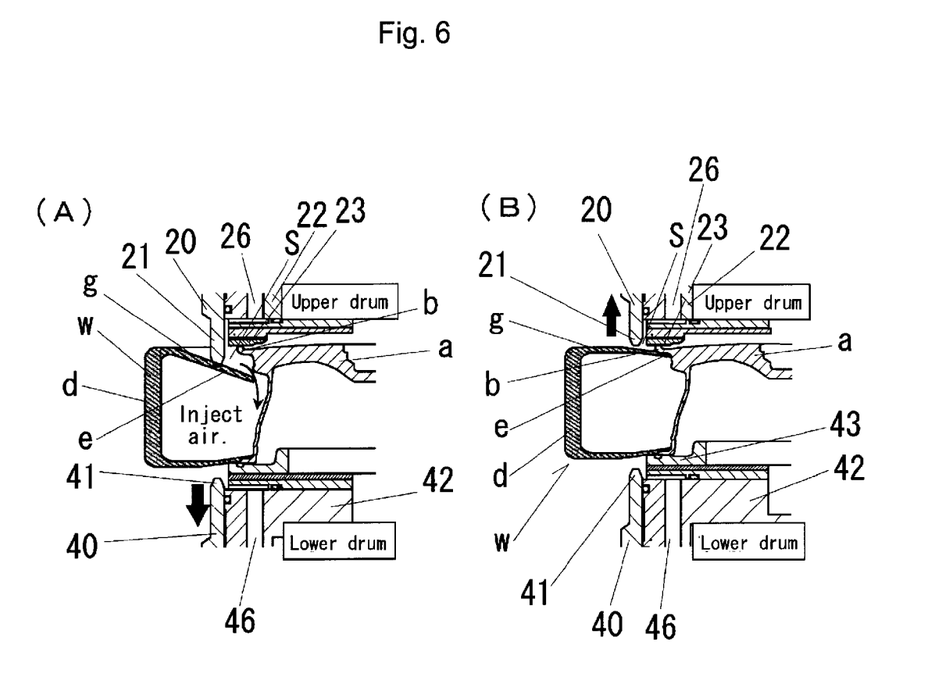
FIGS. 6(a) and 6(b) are explanatory views illustrating a tire assembly during a process of supplying air thereinto.

This series of steps are repeated as appropriate (usually twice). Thereafter, as shown in FIG. 6(a), from the state in which the upper and lower movable drum 20 and 40 are pressing the upper and lower side walls "g", respectively, (the state shown in FIG. 5(c)), the lower movable drum 40 is lowered, and high-pressure air is supplied into the tire "d" through the gap between the upper tire bead rim "e" and the upper engaging rim "b" by switching the electromagnetic valve V1 until the pressure in the tire becomes a normal tire air pressure. Then, as shown in FIG. 6(b), the upper moveable drum 20 is moved up to make the tire "d" airtight. Namely, in this final stage, air supply to the tire assembly "w" is performed.

Here, as the pressure in the tire in the high-pressure state, a pressure in the range of 2.0–4.5 kg/cm$^2$ is thought to be appropriate. To make the snug fitting sufficient, the higher the pressure by which the tire beads "e" are pressed against the engaging rims "b" of the disk wheel "a", the better. Thus, the preferable pressure range is 3.5–4.5 kg/cm$^2$. Here, there arises a concern that such a high pressure may impose a heavy load to the tire. In this invention, however, the pressure is soon released, so that the pressure is not so heavy as to cause damage to the tire. In order to inflate the tire to a normal tire air pressure in the final stage of this process, the final pressure should be 2.0–3.5 kg/cm$^2$. The pressure in the low-pressure state is atmospheric pressure but may be higher than atmospheric pressure.

The tire assembly "w" having undergone the refit process is subjected to a conventional snug fitting process, in which a pressing roller is pressed against the ground contact surface to apply a lateral force thereto, as necessary, and becomes a completed product.

Figure 7:
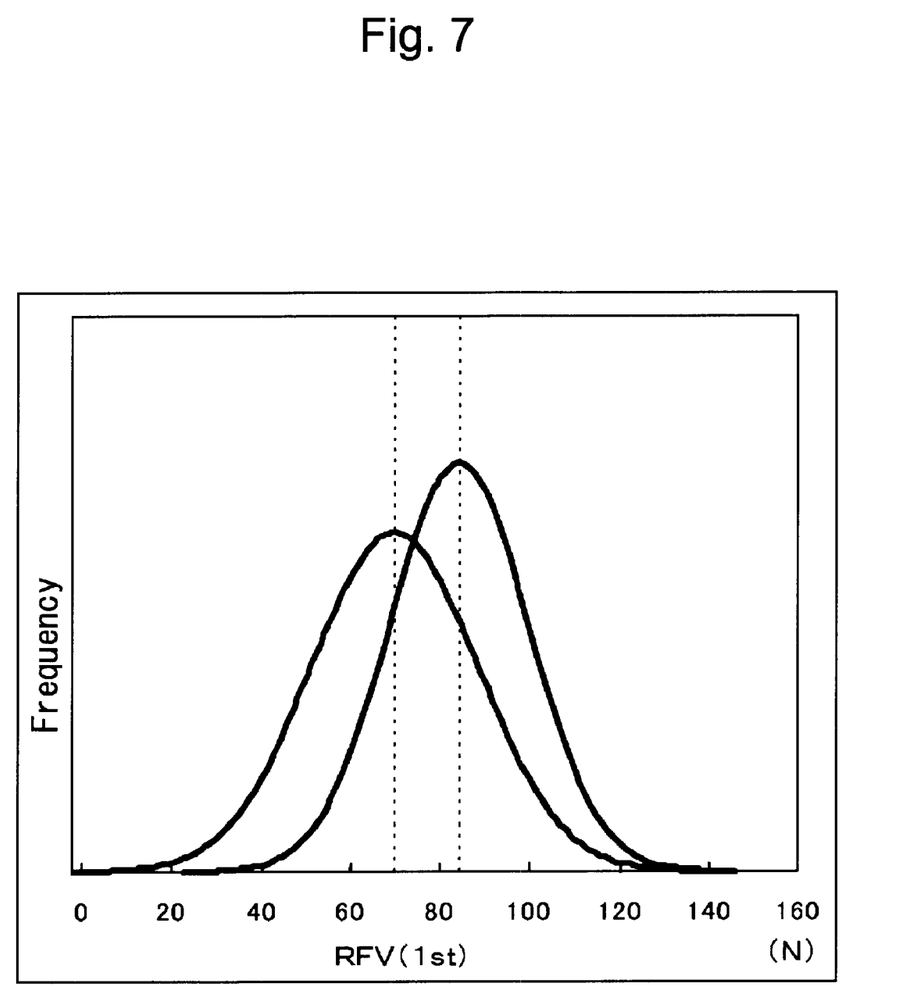
FIG. 7 is a graph of presumed distribution of RFV, which shows the effect of the refitting process.

FIG. 7 shows presumed distribution of RFVs of tire assemblies having undergone the refit process according to the present invention and tire assemblies not having undergone the refit process. Herein, 57 samples taken from each group were inspected. The average of RFVs of the tire assemblies having undergone the refit process was 84N, whereas the average of RFVs of the tire assemblies not having undergone the refit process was 70N. Namely, the refit process lowered the RFV by about 20%, and it has been proved that the refit process has an effect of reducing the RFV. Thus, this refit process makes it possible to obtain a tire assembly "w" which causes less vibration and thus can provide high maneuverability.

Therefore, performing this refit process in assembling a tire assembly can lower proportion defective considerably and makes it possible to provide a tire assembly "w" with a high reliability. When every item of the product is inspected inline, the RFV is assured for every item of the product and productivity and reliability can be considerably improved.

The refit process can be performed continuously and evenly by driving the cylinders 8, 13a to 13c and 43a to 43c in succession and controlling the electromagnetic valves V1 and V2 in succession and thus suitable for an inline assembly. When the refitting apparatus is installed downstream of an assembling apparatus in the assembly line, the refit process can be performed inline to all the products. The refit process takes only about 5–8 seconds, so that the refit process does not cause delay of the entire assembly even when the refitting apparatus is incorporated in the assembly line.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all the changes which come within the meaning and range of equivalency of the claims are therefore intended to be embraced therein.

What is claimed is:

1. In a method of assembling a tire assembly comprising a disk wheel provided with a pair of first and second engaging rims, and a tire fitted to said disk wheel and having a pair of first and second side walls from which a pair of first and second tire bead rims extend, respectively, for releasably engaging said first and second engaging rims, respectively, a refit process comprising:
   (a) a first pressing step of bringing said first tire bead rim of said tire into pressing contact with said first engaging rim of said disk wheel;
   (b) a first pressure releasing step of releasing the pressing contact between said first bead rim of said tire and said first engaging rim of said disk wheel;
   (c) a second pressing step of bringing said second tire bead rim of said tire into pressing contact with said second engaging rim of said disk wheel; and
   (d) a second pressure releasing step of releasing the pressing contact between said second bead rim of said tire and said second engaging rim of said disk wheel.

2. A refit process as set forth in claim 1, wherein a series of steps (a) through (d) is conducted once or at least two times.

3. In a method of assembling a tire assembly comprising a disk wheel provided with a pair of first and second engaging rims, and a tire fitted to said disk wheel and having a pair of first and second side walls from which a pair of first and second tire bead rims extend, respectively, for releasably engaging said first and second engaging rims, respectively, a refit process comprising:
   (a) a first pressing step including pressing said first side wall of said tire from outside to form a first gap between the first tire bead rim of said tire and said first engaging rim of said disk wheel, and injecting air through said first gap to bring said second tire bead rim of said tire into pressing contact with said second engaging rim of said disk wheel,
   (b) a first pressure releasing step of releasing air from said tire through said first gap,
   (c) a first releasing step of pressing said second side wall of said tire from outside to release said second tire bead rim of said tire from said second engaging rim of said disk wheel and to form a second gap between the second tire bead rim of said tire and said second engaging rim of said disk wheel,
   (d) a second pressing step including bringing said first tire bead rim of said tire into contact with said first engaging rim of said disk wheel, and injecting air through said second gap to bring said first tire bead rim of said tire into pressing contact with said first engaging rim of said disk wheel,
   (e) a second pressure releasing step of releasing air from said tire through said second gap, and (f) a second releasing step of pressing said first side wall of said tire from outside to release said first tire bead rim of said tire from said first engaging rim of said disk wheel.

4. A refit process as set forth in claim 3, wherein a series of steps (a) through (f) is repeated once or two or at least two times.

5. A refit process as set forth in claim 4, wherein step (f) of the final series of steps (a) through (f) is followed by:

(g) a step of bringing one of said first and second tire bead rims of said tire into contact with the corresponding engaging rim of said disk wheel so that either one of said first and second gaps remains unclosed, (h) a step of injecting air through said unclosed gap into said tire until a predetermined pressure is established therewithin, and (i) a step of bringing the other one of said first and second tire bead rims of said tire into contact with the corresponding engaging rim of said disk wheel so that both of said first and second gaps are closed.

6. A refitting apparatus for a tire assembly having a disk wheel provided with a pair of first and second engaging rims, and a tire fitted to the disk wheel and having a pair of first and second side walls from which a pair of first and second tire bead rims extend, respectively, for releasably engaging the first and second engaging rims, respectively, said apparatus comprising:

a holding device for holding the tire assembly in a holding position;

upper and lower movable drums disposed above and below, respectively, said holding position, each of said upper and lower movable drums having an annular pressing edge at an end thereof and a pressure controlling space which is formed inside said annular pressing edge;

driving mechanisms operable for moving said upper and lower movable drums toward and away from said holding position;

pressurizing means connected to said pressure controlling space of each of said upper and lower movable drums for injecting high pressure air thereinto to create a high-pressure state in said pressure controlling space;

pressure releasing means connected to said pressure controlling space of each of said upper and lower movable drums for releasing said high pressure air therefrom to create a low-pressure state in said pressure controlling space;

controlling means for executing a refit process comprising:

a first pressing step including moving one of the upper and lower movable drums toward said tire assembly so that said annular pressing edge thereof applies a pressure to said first side walls of said tire from outside to form a first gap between said first tire bead rim of said tire and said first engaging rim of said disk wheel, and injecting air into said tire through said first gap by creating said high-pressure state in said pressure controlling space to bring said second tire bead rim of said tire into pressing contact with said second engaging rim of said disk wheel;

a first pressure releasing step of releasing air from said tire through said first gap by creating said low-pressure state in said pressure controlling space in said movable drum;

a first releasing step including moving said second movable drum toward said tire assembly so that said annular pressing edge thereof applies a pressure to said second side wall of said tire from outside to release said second tire bead rim of said tire from said second engaging rim of said disk wheel and to form a second gap between said first tire bead rim of said tire and said second engaging rim of said disk wheel;

a second pressing step including moving said one movable drum away from said tire assembly to release said pressure on said first side wall and to bring said first tire bead rim of said tire into contact with said first engaging rim of said disk wheel, and injecting air into said tire through said second gap by creating said high-pressure state in said pressure controlling space in the other one of said upper and lower movable drum to bring said first tire bead rim of said tire into pressing contact with said first engaging rims of said disk wheel;

a second pressure releasing step of releasing air in said tire through said second gap by creating said low-pressure state in said pressure controlling space in said the other movable drum; and a second releasing step of moving said one movable drum toward said tire assembly so that said annular pressing edge of said movable drum applies a pressure to said first side wall of said tire from outside to release said first tire bead rim of said tire from said first engaging rim of said disk wheel.

* * * * *